United States Patent [19]

Uchida et al.

[11] 4,193,958

[45] Mar. 18, 1980

[54] PROCESS FOR PREPARING CALCIUM SILICATE SHAPED PRODUCT

[75] Inventors: Mitsuo Uchida, Machida; Yasuo Oguri, Tokyo; Junji Saito, Machida; Tsukasa Kawahara, Tokyo, all of Japan

[73] Assignee: Mitsubishi Chemical Industries, Limited, Tokyo, Japan

[21] Appl. No.: 849,468

[22] Filed: Nov. 7, 1977

[30] Foreign Application Priority Data

Nov. 18, 1976 [JP] Japan .................................. 51/138721
Nov. 22, 1976 [JP] Japan .................................. 51/140439
Dec. 14, 1976 [JP] Japan .................................. 51/150066
May 31, 1977 [JP] Japan .................................... 52/63621

[51] Int. Cl.$^2$ .............................................. B28B 1/26
[52] U.S. Cl. ...................................... 264/86; 106/120; 264/333
[58] Field of Search ................... 106/120; 264/86, 333

[56] References Cited

U.S. PATENT DOCUMENTS

| 2,105,324 | 1/1938 | Huttemonn et al. ............. 106/120 |
| 2,215,891 | 9/1940 | Thomson et al. .................... 264/333 |
| 3,144,346 | 8/1964 | Dilnot ................................ 264/333 |
| 3,501,324 | 3/1970 | Kubo .................................. 106/120 |
| 3,679,446 | 7/1972 | Kubo .................................. 106/120 |
| 3,988,419 | 10/1976 | Mori .................................. 106/120 |
| 4,111,712 | 9/1978 | Pusch ................................ 106/120 |
| 4,128,434 | 12/1978 | Pusch ................................ 106/120 |

OTHER PUBLICATIONS

Japanese Unexamined Publication No. 42498/1972.

*Primary Examiner*—Robert F. White
*Assistant Examiner*—John A. Parrish
*Attorney, Agent, or Firm*—Oblon, Fisher, Spivak, McClelland & Maier

[57] ABSTRACT

An aqueous slurry of calcium silicate hydrate which is formed by heating a siliceous source and a calcareous source in water to react them and which has the specific property is shaped with a press filter molding and cured by a steam curing under steam pressure to cause a transformation of the calcium silicate hydrate whereby a calcium silicate shaped product having low bulk density and high mechanical strength is obtained. The calcium silicate shaped product is suitable as a lagging product or a heat insulator.

11 Claims, No Drawings

PROCESS FOR PREPARING CALCIUM SILICATE SHAPED PRODUCT

BACKGROUND OF THE INVENTION

1. Field of the Invention

The present invention relates to a process for preparing a calcium silicate shaped product, more particularly, it relates to a process for preparing a calcium silicate shaped product which is suitable as a lagging product or a heat insulator.

2. Description of the Prior Arts

It has been known to prepare calcium silicate products by the following processes.

(1) A slurry is prepared by dispersing and mixing a siliceous source and a calcareous source and optionally inorganic materials such as clay, asbestos with water and the slurry is poured into a mold and cured in an autoclave (steam curing) and the cured product is taken out from the mold and dried.

(2) The slurry prepared by the process (1) is heated at 80° to 100° C. and is poured into a mold and shaped with a press filter molding and the product is taken out from the mold and cured in an autoclave and dried.

(3) The slurry prepared by the process (1) is heated under higher pressure with stirring to crystallize and the resulting slurry containing crystalline calcium silicate hydrate is poured into a mold and the product is shaped with a press filter molding and taken out from the mold and dried.

When a calcium silicate product is used as a lagging product or a heat insulator, it is usually necessary to have high porosity that is, low bulk density in order to obtain a product having low thermal conductivity. However in the conventional processes (1) and (2), it has been difficult to obtain a product having low bulk density such as less than 0.2 g/cm$^3$ especially less than 01.3 g/cm$^3$ e.g. about 0.1 g/cm$^3$. In the conventionl process (3), it has been possible to obtain a product having low bulk density however, the mechanical strength has been remarkably low, disadvantageously.

The inventors have studied this in order to overcome the difficulties.

SUMMARY OF THE INVENTION

It is an object of the present invention to provide a process for preparing a calcium silicate shaped product having low bulk density and high mechanical strength.

The foregoing and other objects of the present invention have been attained by forming an aqueous slurry of calcium silicate hydrate of tobermorite group compounds having a wet volume of more than 15 cm$^3$/g and shaping the aqueous slurry with a press filter, molding and curing it with steam under pressure whereby the transformation of the calcium silicate hydrate results from semi-crystalline or near-amorphous tobermorite to crystalline tobermorite or xonotlite or from crystalline tobermorite to xonotlite.

DETAILED DESCRIPTION OF THE PREFERRED EMBODIMENTS

Various types of calcium silicates are found and classified as follows.

(I) xonotlite
(II) tobermorites
   crystalline tobermorites
   semi-crystalline tobermorites C-S-H (I) Ca/Si < 1.5

C-S-H (II) Ca/Si ≧ 1.5 near-amorphous tobermorites
   tobermorite gel (predominant constituent) etc.
   Ca/Si probably usually ≧ 1.5.

In the process of the present invention, an aqueous slurry of calcium silicate hydrate of tobermorite group compounds having the below-mentioned wet volume of more than 15 cm$^3$/g is prepared by reacting a siliceous source with a calcareous source in water as an aqueous dispersion under heating it.

Suitable siliceous sources include natural sources such as diatomaceous earth, terra abala, quartzite and silicon dust; silica obtained by reacting aluminum hydroxide with hexafluorosilicic acid as a by-product in a wet process for producing phosphoric acid (hereinafter referring to as a wet process phosphoric acid by-product silica) and other industrial by-product silica.

The siliceous sources can be amorphous or crystalline form. It is preferable to use an amorphous siliceous source such as diatomaceous earth, the wet process phosphoric acid by-product silica and silicon dust because a slurry of calcium silicate hydrate having the wet volume of more than 15 cm$^3$/g is easily obtained. The wet process phosphoric acid by-product silica is also a suitable siliceous source in the case of the known process for preparing calcium silicate hydrate by the conventional hydrothermal reaction.

Suitable calcareous sources include quick lime, slaked lime, carbide waste and cement.

Blast furnace slag can be used as the siliceous source and the calcareous source. The blast furnace slag is a by-product in a pig iron production and an amorphous glassy material comprising 35 to 50 wt.% of CaO, 30 to 40 wt.% of SiO$_2$, 5 to 20 wt.% of Al$_2$O$_3$ and 3 to 10 wt.% of MgO and it is suitable to obtain tobermorite type calcium silicate hydrate. Since an alumina component is included, hydrogarnet is formed as a by-product. When a water soluble alkali metal compound is added, the formation of hydrogarnet can be prevented. This method is also suitable in the case of the known hydrothermal reaction.

Suitable water soluble alkali metal compounds include sodium or potassium hydroxides, silicates, sulfates, nitrates and chlorides. It is preferable to add sodium hydroxide, potassium hydroxide, sodium silicate.

The mole ratio of CaO/SiO$_2$ is usually in a range of 0.8 to 1.2 in the case of xonotlite as the hydrated calcium silicate in the shaped product and it is usually in a range of 0.7 to 1.0 in the case of tobermorite as the calcium silicate hydrate in the shaped product.

When the blast furnace slag is used, sometimes, the mole ratio of CaO to SiO$_2$ is out of the range for forming crystalline tobermorite, depending upon the kind of the blast furnace slag. In such case, the other calcareous source and/or the siliceous source can be added to adjust the mole ratio of CaO to SiO$_2$ in the above-mentioned range. The amount of the water soluble alkali metal compound is usually at least 5 wt.% preferably 5 to 40 wt.% as alkali metal hydroxide to the solid components of the blast furnace slag.

The amount of water used for dispersing the siliceous source and the calcareous source is more than 15 times by weight especially 17 to 40 times by weight to the solid content.

When the siliceous source and the calcareous source dispersed in water, are heated to react them, an aqueous slurry of calcium silicate hydrate is obtained. In the process of the present invention, the calcium silicate hydrate in the aqueous slurry should have the below-mentioned wet volume of more than 15 cm$^3$/g.

The wet volume is calculated by the equation (I)

$$\text{wet volume} = \frac{V}{W} \quad (I)$$

wherein W represents a total weight of the calcareous source and the siliceous source and V represents a volume of solid components after 24 hours in a sedimentation of the aqueous slurry obtained by the reaction.

The wet volume is measured as follows. $W_1$ g of the aqueous slurry obtained by the reaction ($W_0$ g) is sampled and kept in stand-still for 24 hours and the volume ($V_1$ cm$^3$) of the sedimented solid components is measured and the wet volume is calculated by the equation (II);

$$\text{wet volume} = \frac{V_1}{W_1 \times \frac{W}{W_0}} \quad (II)$$

wherein W represents a total weight of the equation (I).

In order to give the wet volume of more than 15 cm$^3$/g, the reaction is carried out at higher than 130° C. preferably 150° to 230° C. especially 160° to 210° C., under stirring. It is necessary to maintain the reaction system in a liquid condition whereby the reaction is carried out under higher pressure. When certain siliceous source is used, it is possible to give the wet volume of more than 15 cm$^3$/g at the reaction temperature out of said range. Thus, when an amorphous material is used, it is advantageous in an industrial process to carry out the reaction at the reaction temperature in said range.

The calcium silicate hydrate in the aqueous slurry should be semi-crystalline, near-amorphous or crystalline tobermorite (especially 11.3 Å tobermorite). Various calcium silicate hydrates have been known and they can be classified by the classification described in The Chemistry of Cements (Edited by H. F. W. Taylor, Department of Chemistry, University of Aberdeen, Scotland) Volume I P. 182, Table II.; Classification of the tobermorite. Tobermorite group compounds are classified to semi-crystalline tobermorite, near-amorphous tobermorite and crystalline tobermorite. In the process of the present invention, suitable ones can be used as far as it has the wet volume of more than 15 cm$^3$/g. The calcium silicate hydrate causes the transformation in the order of tobermorite gel→C-S-H(II)→C-S-H(I)→11.3 Å tobermorite→xonotlite whereby suitable crystalline type can be easily obtained by controlling the reaction temperature and the reaction time. That is, the transformation of the crystalline type is caused to the arrow line (→) depending upon rising the reaction temperature or prolonging the reaction time. When the reaction is attained in the range of the temperature to give the wet volume of more than 15 cm$^3$/g, tobermorite group compounds are usually obtained. When the reaction temperature is too high or the reaction time is too long, xonotlite is obtained. In such case, the reaction temperature is lowered or the reaction time is shortened. When the shaped product made of crystalline tobermorite is desired, the calcium silicate hydrate in an aqueous slurry should be semi-crystalline or near-amorphous tobermorite.

In the process of the present invention, the calcium silicate hydrate in the aqueous slurry should have the above-mentioned two characteristics. A shaped product having low bulk density and high mechanical strength could not be obtained when either of the two characteristics is not satisfied.

The aqueous slurry is shaped with a press filter molding by the conventional processes.

It is preferable to admix a fibrous material for reinforcing the shaped product before shaping with a press filter molding. The fibrous material can be incorporated when the siliceous source and the calcareous source are heated to react them.

Suitable reinforcing fibrous materials include inorganic fibers such as asbestos, rockwool and glass fiber; and organic fibers such as polypropylene, polyethylene, polyester and polyamide fibers. It is preferable to use inorganic fibers which have resistance to hydrothermal reaction.

The ratio of the addition of the fibrous material is usually in a range of 1 to 20 wt.% preferably 3 to 15 wt.% to the shaped product.

The pressure in the press filter molding is usually in a range of 1 to 200 Kg/cm$^2$G. and the bulk density of the shaped product can be controlled by an adjustment of a piston stroke of the pressing machine.

The shaped product is cured under higher pressure by the steam curing, that is, the curing in an autoclave (induration).

In accordance with the steam curing, it is necessary to attain the transformation from semi-crystalline or near-amorphous tobermorite to crystalline tobermorite or xonotlite or from crystalline tobermorite to xonotlite. The object of the present invention can not be attained without the transformation of the crystalline form by the steam curing.

The reaction time can be shortened by rising the steam pressure. The steam pressure is usually in a range of 5 to 50 Kg/cm$^2$G. and it is especially in a range of 12 to 40 Kg/cm$^2$G to obtain the shaped product of xonotlite and in a range of 6 to 30 Kg/cm$^2$G to obtain the shaped product of tobermorite.

The transformation is easily attained under these conditions. When a desired transformation was not attained, for example, tobermorite is formed even though xonotlite is expected, the desired transformation may be attained by rising the steam pressure or prolonging the steam curing time. When xonotlite is formed even though tobermorite is expected, the desired transformation may be attained by falling the steam pressure or shortening the steam curing time.

The process of the present invention has been described in detail. The calcium silicate shaped product obtained by the present invention has high bending strength such as 5 to 8 Kg/cm$^2$ even though the bulk density is about 0.10 g/cm$^3$ and has remarkably high thermal insulating property and has high refractoriness at the temperature of about 650° to 1000° C. Accordingly, the calcium silicate shaped product can be used in various fields such as refractory insulators and construction substrates.

The present invention will be illustrated by certain examples which are provided for purpose of illustration only and are not intended to be limiting unless otherwise specified.

EXAMPLE 1

A slaking was carried out by adding hot water to 43.4 wt. parts of quick lime (98% of CaO), and 46.6 wt. parts of the wet process phosphoric acid by-product silica (97.8% of $SiO_2$; 0.4% of $Al_2O_3$ and 1.5% of ignition loss) was added to the slaked lime, and water added to give 30 times by weight of water to the solid content. The resulting suspension was stirred in an autoclave at 191° C. under the pressure of 12 $Kg/cm^2G$ for 4 hours to react them, whereby an aqueous slurry of C-S-H (I) type calcium silicate having the wet volume of 17 $cm^3/g$ was obtained.

The aqueous slurry was admixed with 10 wt. parts of asbestos and the mixture was shaped with a press filter molding. The resulting shaped product was cured with steam in an autoclave at 209° C. under a steam pressure of 18 $Kg/cm^2G$ for 4 hours whereby the transformation of the crystals of the shaped product from the C-S-H (I) type to xonotlite was attained. The product was dried at 150° C. for 8 hours to obtain a shaped product having a bulk density of 0.1 $g/cm^3$ and a bending strength of 8.0 $Kg/cm^2$.

REFERENCE 1

In accordance with the process of Example 1, the reaction was carried out at 209° C. for 3 hours to obtain an aqueous slurry of xonotlite having the wet volume of 25 $cm^3/g$, and the aqueous slurry was shaped and cured with steam and dried to obtain a shaped product having a bulk density of 0.1 $g/cm^3$ and a bending strength of 2.7 $Kg/cm^2$.

REFERENCE 2

In accordance with the process of Example 1, the aqueous slurry of Reference 1 was shaped and dried at 150° C. for 20 hours to obtain a shaped product having a bulk density of 0.1 $g/cm^3$ and a bending strength of 2.7 $Kg/cm^2$.

EXAMPLE 2

A slaking was carried out by adding hot water to 41.3 wt. parts of quick lime (98% of CaO) and 48.7 wt. parts of diatomaceous earth (89.2% of $SiO_2$; 4.1% of $Al_2O_3$; 3.0% of ignition loss; 1.5% of $Fe_2O_3$; 0.5% of CaO and 0.5% of MgO) (manufactured by Kanto Bentonite Co. Ltd.) was added to the slaked lime and water was added to give 30 times by weight of water to the solid content. The resulting suspension was stirred in an autoclave at 175° C. under the pressure of 8 $Kg/cm^2G$ for 4 hours to react them, whereby an aqueous slurry of tobermorite having the wet volume of 17 $cm^3/g$ was obtained.

The aqueous slurry was admixed with 10 wt. parts of asbestos and the mixture was shaped with a press filter molding. The resulting shaped product was cured with steam in an autoclave at 209° C. under a steam pressure of 18 $Kg/cm^2G$ for 4 hours whereby the transformation of the crystals of the shaped product from tobermorite to xonotlite was attained. The product was dried at 150° C. for 8 hours to obtain a shaped product having a bulk density of 0.1 $g/cm^3$ and a bending strength of 4.5 $Kg/cm^2$.

REFERENCE 3

In accordance with the process of Example 2, the reaction was carried out at 209° C. under the pressure of 18 $Kg/cm^2G$ for 5 hours to obtain an aqueous slurry of xonotlite having a wet volume of 27 $cm^3/g$, and the aqueous slurry was shaped and cured with steam and dried to obtain a shaped product having a bulk density of 0.11 $g/cm^3$ and a bending strength of 2.8 $Kg/cm^2$.

REFERENCE 4

In accordance with the process of Example 2, the aqueous slurry of Reference 3 was shaped and dried at 150° C. for 2 hours to obtain a shape product having a bulk density of 0.11 $g/cm^3$ and a bending strength of 2.9 $Kg/cm^2$.

REFERENCE 5

In accordance with the process of Example 2, the reaction was carried out at 90° C. for 2 hours to obtain an aqueous slurry of a gel having a wet volume of 13 $cm^3/g$ and the aqueous slurry was shaped and cured with steam for 8 hours whereby the transformation of the crystals of the shaped product from the gel to xonotlite was attained. The product was dried to obtain a shaped product having a bulk density of 0.26 $g/cm^3$ and a bending strength of 11.9 $Kg/cm^2$. It was impossible to obtain a shaped product having a low bulk density such as about 0.1 $g/cm^3$.

EXAMPLE 3

A slaking was carried out by adding hot water to 35.7 wt. parts of quick lime (98% of CaO) and 54.3 wt. parts of diatomaceous earth (83.1% of $SiO_2$; 4.98% of $Al_2O_3$; 7.59% of ignition loss; 1.58% of $Fe_2O_3$; 0.54% of CaO and 0.32% of MgO) (manufactured by Hokushu Keisodo Co. Ltd.) was added to the slaked lime and water was added to give 25 times by weight of water to the solid content. The resulting suspension was stirred in an autoclave at 191° C. under the pressure of 12 $Kg/cm^2G$ for 3 hours to react them, whereby an aqueous slurry of C-S-H (I) type calcium silicate having the wet volume of 22 $cm^3/g$ was obtained.

The aqueous slurry was admixed with 10 wt. parts of asbestos and the mixture was shaped with a press filter molding. The resulting shaped product was cured with steam in an autoclave at 209° C. under a steam pressure of 18 $Kg/cm^2G$ for 4 hours whereby the transformation of the crystals of the shaped product from the C-S-H (I) type to 11.3 A tobermorite was attained.

The product was dried at 150° C. for 8 hours to obtain a shaped product having a bulk density of 0.10 $g/cm^3$ and a bending strength of 5.5 $Kg/cm^2$.

REFERENCE 6

In accordance with the process of Example 3, the reaction was carried out at 90° C. for 2 hours to obtain an aqueous slurry of a gel having a wet volume of 10 $cm^3/g$, and the aqueous slurry was shaped and cured with steam for 6 hours whereby the transformation of crystals of the shaped product from the gel to tobermorite was attained. The product was dried to obtain a shaped product having a bulk density of 0.20 $g/cm^3$ and a bending strength of 5.0 $Kg/cm^2$. It was impossible to obtain a shaped product having a low bulk density such as about 0.1 $g/cm^3$.

EXAMPLE 4

A slaking was carried out by adding hot water to 42.9 wt. parts of quick lime (98% of CaO) and 47.1 wt. parts of silicon dust ($SiO_2$ 95.4%, C 0.5%, $Fe_2O_3$ 0.14%, MgO 0.5%, Ig Loss 2.2%) was added to the slaked lime, and water was added to give 30 times by weight of water to the solid content. The resulting suspension was stirred in an autoclave at 175° C. under the pressure of 8 Kg/cm²G for 3 hours to react them, whereby an aqueous slurry of tobermorite gel having the wet volume of 22 cm³/g was obtained.

The aqueous slurry was admixed with 10 wt. parts of asbestos and the mixture was shaped with a press filter molding. The resulting shaped product was cured with steam in an autoclave at 209° C. under a steam pressure of 18 Kg/cm²G for 4 hours whereby the transformation of crystals of the shaped product from the tobermorite gel to xonotlite was attained. The product was dried at 150° C. for 8 hours to obtain a shaped product having a bulk density of 0.10 g/cm³ and a bending strength of 7.5 Kg/cm².

EXAMPLE 5

A slaking was carried out by adding hot water to 45.8 wt. parts of quick lime (98% of CaO) and 49.2 wt. parts of the wet process phosphoric acid by-product silica (97.8% of $SiO_2$) was added to the slaked lime and water was added to give 30 times by weight of water to the solid content. The resulting suspension was stirred in an autoclave at 200° C. under the pressure of 15 Kg/cm²G for 3 hours to react them, whereby an aqueous slurry of C-S-H (I) type calcium silicate having the wet volume of 22 cm³/g was obtained.

The aqueous slurry was admixed with 5 wt. parts of rockwool dispersed in water and the mixture was shaped with a press filter molding draining. The resulting shaped product was cured with steam in an autoclave at 209° C. under a steam pressure of 18 Kg/cm²G for 4 hours whereby the transformation of the crystals of the shaped product from the C-S-H (I) to xonotlite was attained. The product was dried at 150° C. for 8 hours to obtain a shaped product having a bulk density of 0.1 g/cm³ and a bending strength of 4.3 Kg/cm².

EXAMPLE 6

A slaking was carried out by adding hot water to 43.2 wt. parts of quick lime (98% of CaO) and 46.8 wt. parts of ground quartzite (97.0% of $SiO_2$; 1.2% of $Al_2O_3$ and 0.09% of $Fe_2O_3$) (manufactured by Tokai Kogyo Co., Ltd.) was added to the slaked lime and water was added to give 30 times by weight of water to the solid content. The resulting suspension was stirred in an autoclave at 191° C. under the pressure of 12 Kg/cm²G for 3 hours to react them, whereby an aqueous slurry of the tobermorite gel having the wet volume of 20 cm³/g was obtained.

The aqueous slurry was admixed with 10 wt. parts of asbestos and the mixture was shaped with a press filter molding. The resulting shaped product was cured with steam in an autoclave at 209° C. under a steam pressure of 18 Kg/cm²G for 4 hours whereby the transformation of the crystals of the shaped product from the tobermorite gel to xonotlite was attained. The product was dried at 150° C. for 8 hours to obtain a shaped product having a bulk density of 0.1 g/cm³ and a bending strength of 7.2 Kg/cm².

EXAMPLE 7

A slaking was carried out by adding hot water to 45.8 wt. parts of quick lime (98% of CaO) and 49.2 wt. parts of the wet process phosphoric acid by product silica (97.8% of $SiO_2$) was added to the slaked lime and water was added to give 30 times by weight of water to the solid content. The resulting suspension was stirred in an autoclave at 200° C. under the pressure of 15 Kg/cm²G for 3 hours to react them, whereby an aqueous slurry of C-S-H (I) type calcium silicate having the wet volume of 22 cm³/g was obtained.

The aqueous slurry was admixed with 3 wt. parts of asbestos and 2 wt. parts of rockwool, and the mixture was shaped with a press filter molding. The resulting shaped product was cured with steam in an autoclave at 209° C. under a steam pressure of 18 Kg/cm²G for 4 hours whereby the transformation of the crystals of the shaped product from the C-S-H (I) to xonotlite was attained. The product was dried at 150° C. for 8 hours to obtain a shaped product having a bulk density of 0.1 g/cm³ and a bending strength of 7.0 Kg/cm².

EXAMPLE 8

65.3 Wt. parts of the blast furnace slag (33.3% of $SiO_2$; 17.0% of $Al_2O_3$; 0.9% of $Fe_2O_3$; 41.5% of CaO; 4.2% of MgO; 0.7% of MnO; 1.0% of S and 0.4% of ignition loss) and 14.7 wt. parts of the wet process phosphoric acid by-product silica (95.5% of $SiO_2$ and 0.4% of $Al_2O_3$) were admixed, and 10 wt. parts of sodium hydroxide and 10 wt. parts of asbestos were added to the mixture and water was added to give 20 times by weight of water to the solid content. The resulting suspension was stirred in an autoclave at 150° C. under the pressure of 4 Kg/cm²G for 1 hour to react them, whereby an aqueous slurry of tobermorite gel having the wet volume of 18 cm³/g was obtained.

An aqueous slurry was shaped with a press filter molding and the resulting shaped product was cured with steam in an autoclave at 191° C. under a steam pressure of 12 Kg/cm²G for 2 hours whereby the transformation of crystals of the shaped product from the tobermorite gel to 11.3 A tobermorite was attained. The product was dried at 150° C. for 8 hours to obtain a shaped product having a bulk density of 0.125 g/cm³ and a bending strength of 4.8 Kg/cm².

EXAMPLE 9

A slaking was carried out by adding hot water to 6.3 wt. parts of quick lime (98% of CaO) and 37.0 wt. parts of the blast furnace slag (33.3% of $SiO_2$; 17.0% of $Al_2O_3$; 0.9% of $Fe_2O_3$; 41.5% of CaO; 4.2% of MgO; 0.7% of MnO; 1.0% of S and 0.4% of ignition loss), 46.7 wt. parts of water glass (36.5% of $SiO_2$; 18% of $Na_2O$ and 45.5% of ignition loss) and 10 wt. parts of asbestos were added to the slaked lime, and water was added to give 20 times by weight of water to the solid content. The resulting suspension was stirred in an autoclave at 150° C. under the pressure of 4 Kg/cm²G for 1 hour to react them, whereby an aqueous slurry of tobermorite gel having the wet volume of 17 cm³/g was obtained.

An aqueous slurry was shaped with a press filter molding and thr resulting shaped product was cured with steam in an autoclave at 191° C. under a steam pressure of 12 Kg/cm²G for 2 hours whereby the transformation of crystals of the shaped product from the tobermorite gel to 11.3 A tobermorite was attained. The product was dried at 150° C. for 8 hours to obtain a shaped product having a bulk density of 0.125 g/cm³ and a bending strength of 5.1 Kg/cm².

What is claimed is:

1. A process for preparing a calcium silicate shaped product, of bulk density lower than 0.13 g/cm³ and bending strength of 4.3-8 kg/cm² which comprises:
    forming an aqueous slurry of calcium silicate hydrate of tobermorite group compounds having a wet volume of more than 15 cm³/g by heating at a temperature higher than 130° C. a siliceous source and a calcareous source dispersed in water to react them;

shaping the aqueous slurry with a press filter molding;

curing said filtered slurry by a steam curing under pressure while transforming said calcium silicate hydrate from semi-crystalline or near-amorphous tobermorite to crystalline tobermorite or xonotlite; or from crystalline tobermorite to xonotlite; wherein said wet volume is given by the equation:

$$\text{wet volume} = \frac{V}{W}$$

wherein W represents the total weight of the calcareous source and the siliceous source, and V represents the volume of solid components after a 24 hour sedimentation of said aqueous slurry.

2. A process according to claim 1 wherein said aqueous slurry of calcium silicate hydrate is admixed with reinforcing fibrous materials and the mixture is shaped with a press filter molding and cured by the steam curing under higher pressure.

3. A process according to claim 1 wherein said aqueous slurry of calcium silicate hydrate is prepared by mixing the siliceous source and the calcareous source with reinforcing fibrous materials and heating the mixture in water and said aqueous slurry is shaped with a press filter molding and cured by the steam curing under higher pressure.

4. A process according to claim 1 wherein the reaction of the siliceous source and the calcareous source is carried out at 150° to 230° C.

5. A process according to claim 1 wherein the steam curing is carried out with steam under the steam pressure of 5 to 50 $Kg/cm^2G$.

6. A process according to claim 1 wherein the siliceous source is amorphous.

7. A process according to claim 1 wherein the siliceous source is a silica obtained by reacting hexafluorosilicic acid with aluminum hydroxide.

8. A process according to claim 1 wherein the siliceous source is diatomaceous earth.

9. A process according to claim 1 wherein the siliceous source is silicon dust.

10. A process according to claim 1 wherein a blast furnace slag with a water soluble inorganic alkali metal compound is used as both of the siliceous source and the calcareous source.

11. A process according to claim 1 wherein the siliceous source is ground quartzite.

* * * * *